(12) United States Patent
Nakamura et al.

(10) Patent No.: US 7,023,418 B2
(45) Date of Patent: Apr. 4, 2006

(54) DISPLAY DEVICE, ELECTRONIC PAPER AND ELECTRONIC PAPER FILE

(75) Inventors: Tetsuro Nakamura, Hyogo-ken (JP); Masichiro Tatekawa, Osaka-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 759 days.

(21) Appl. No.: 09/906,002

(22) Filed: Jul. 17, 2001

(65) Prior Publication Data

US 2002/0054033 A1    May 9, 2002

(30) Foreign Application Priority Data

Jul. 18, 2000 (JP) ............................... 2000-217560

(51) Int. Cl.
*G09G 3/36* (2006.01)

(52) U.S. Cl. ............... 345/102; 345/901; 349/61; 349/65; 362/31; 362/558; 362/561; 250/116

(58) Field of Classification Search ............... 345/76, 345/87, 102, 107, 901; 349/61–67; 250/116; 362/31, 561
See application file for complete search history.

(56) References Cited

U.S. PATENT DOCUMENTS

| | | | | |
|---|---|---|---|---|
| 5,534,888 A * | 7/1996 | Lebby et al. | ............... | 345/672 |
| 5,712,694 A * | 1/1998 | Taira et al. | ................ | 349/9 |
| 5,966,192 A * | 10/1999 | Higuchi et al. | ............. | 349/61 |
| 5,999,685 A * | 12/1999 | Goto et al. | ............... | 385/146 |
| 6,132,053 A * | 10/2000 | Sendova | ............... | 362/31 |
| 6,323,919 B1 * | 11/2001 | Yang et al. | ............... | 349/63 |
| 6,507,378 B1 * | 1/2003 | Yano et al. | ............... | 349/63 |
| 6,680,725 B1 * | 1/2004 | Jacobson | ............... | 345/107 |
| 6,697,039 B1 * | 2/2004 | Yamakawa et al. | ............. | 345/98 |
| 6,806,922 B1 * | 10/2004 | Ishitaka | ............... | 349/62 |

FOREIGN PATENT DOCUMENTS

| | | |
|---|---|---|
| JP | 10-171620 | 6/1998 |
| JP | 11-502950 | 3/1999 |
| WO | PCT/US96/12000 | 7/1996 |

OTHER PUBLICATIONS

Sano, et. al, "*Decolorable Ink (Imaging Material)*," Japan Hardcopy '99—Theses, pp. 209-251, Toshiba Corporation Research and Development Center.

* cited by examiner

*Primary Examiner*—Henry N. Tran
(74) *Attorney, Agent, or Firm*—McDermott Will & Emery LLP

(57) ABSTRACT

The invention comprises a display sheet, a light guide sheet and a light source provided to at least one side of the light guide sheet. And an electronic paper of the invention has a configuration for color display that the display sheet is made up by laminating respective display sheets for red, green and blue colors.

10 Claims, 10 Drawing Sheets

FIG. 7
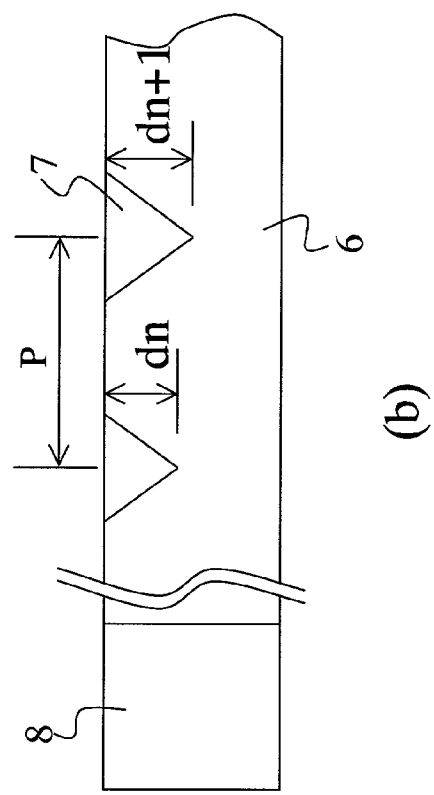
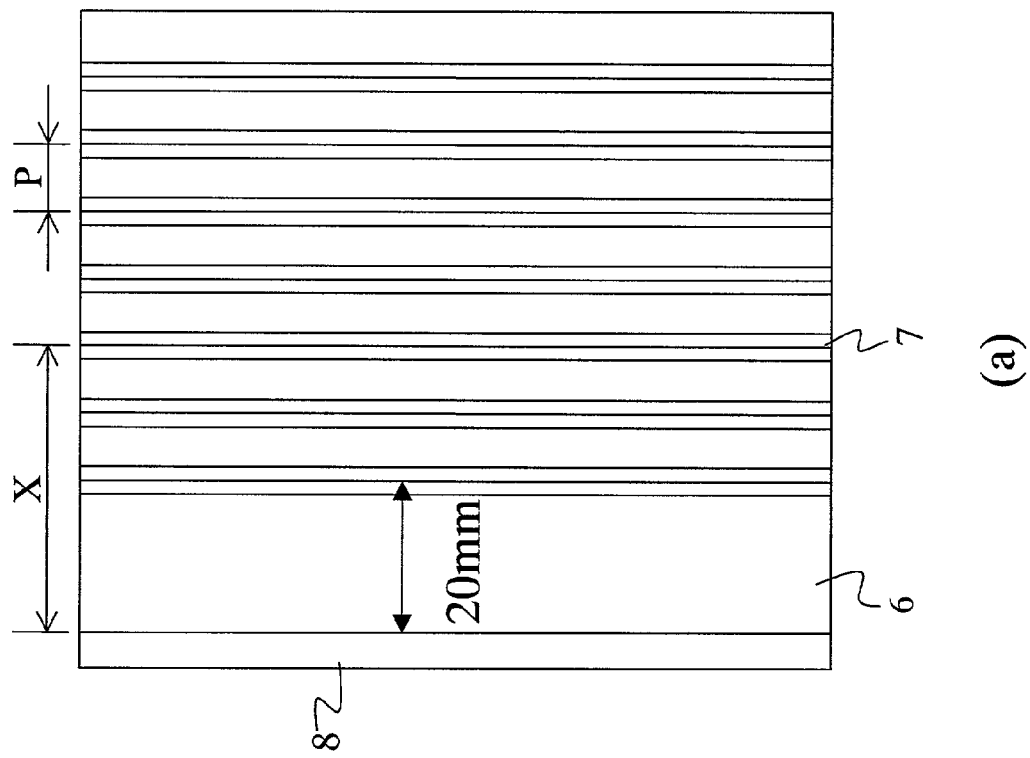

DISPLAY DEVICE, ELECTRONIC PAPER AND ELECTRONIC PAPER FILE

BACKGROUND OF THE INVENTION

1. Field of the Invention

The invention relates to a display device such as an electronic paper, an electronic paper file and the like, which comprising a sheet-like display unit provided with data-writing means and data-eliminating means, for example.

2. Description of the Related Art

The more the recent information technology society progresses, the more the technology for a display and a hardcopy get to be important. The paper, which has always been used as a medium of information communication, is very usable still now regarding the portability, the record-ability and the method of recognizing information by human. Therefore, not only a display medium such as CRT and LCD, but also a sheet-like display medium including the memory function has been developed recently.

As the above sheet-like display medium, the concept of an electronic paper is proposed (in Japanese laid-open publication No. 10-171620), and an electronic paper file is also proposed in which a plurality of electronic papers are bound into a book (PCT Japanese translation publication No. 11-502950). In addition, as a recording material to be applied to the display medium various rewritable recording materials are studied (See pp 209 to 251 of "Japan Hardcopy'99—Theses" published by The Imaging Society in Japan).

One of the rewritable recoding mediums is a nonvolatile material, which is applied to the electronic paper. There is a display medium using the smectic liquid crystal of the transmissive liquid crystal and the Guest-Host type of the liquid crystal/polymer composite film adopting the dichronic dye as the nonvolatile materials, for example. In the display medium, the dichronic dye is oriented together with the liquid crystal by heat and gets to be in the focal conic state; thereby the light absorption increases, and the display medium gets luminous. Additionally, by loading the electric charge on the display medium, the focal conic state changes to the homeotropic state, and then the colors fade away.

A display medium 30 as shown in FIG. 10 is configured so as a front-light 31 is provided to under a display unit 34 intervening an air-layer 35 between them; the display unit 34 using a reflective liquid crystal as the nonvolatile material. The front-light 31 comprises a light guide plate 33 and a light source 32 such as a cold-cathode tube or LED attached to one side of the light guide plate 33. Moreover, either of the upper surface or the lower surface of the light guide plate 33 is formed in a shape of prism consecutively so that the light from the light source 32 may irradiate a whole surface of the display unit 34.

The liquid crystal used by the display unit of the above-mentioned display medium is the nematic type or the smectic type. In the either case, when the display is performed in the color mode of Red (R), Green (G), and Blue (B), three liquid crystals corresponding to the RGB must be arranged in parallel on a plane surface in order to display one pixel. That is to say, the number of pixels on the display unit in the color mode requires three times as much as that in the monochrome mode.

As shown in the configuration of the conventional display medium 30, when there is the air-layer 35 between the display unit 34 using the reflective crystal liquid and the light guide plate 33 of the front-light 31, a light coming in at a specific incident angle, which is one of the lights coming into the display unit 34 from the light guide plate 33, reflects on the surface of the display unit 34, therefore the contrast and the coefficient of utilization of light decrease.

SUMMARY OF THE INVENTION

In consideration of the above situations, the invention is proposed and has an object to provide a display device such as an electronic paper and electronic paper file; the electronic paper of a sheet-like recoding medium has the number of pixels for displaying in color mode as much as those in monochrome mode, and the display device capable of improving the coefficient of utilization of the light from a light source.

In order to achieve the above object, the invention has a configuration that a display sheet of a display unit is directly joined to a light guide sheet.

The display sheet has a reflective type structure that the display sheet using a nonvolatile and reflective liquid crystal for red color, the display sheet using a nonvolatile and reflective liquid crystal for green color, and the display sheet using a nonvolatile and reflective liquid crystal for blue color are laminated.

The light guide sheet is configured so as to attaching a light source for illumination to either sides or one side of the light guide sheet. The light from the light source is guided to a specific position of the display sheet. The light guide sheet is provided with a specific number of grooves to have a specific shape and a specific depth arranged on an upper side of the light guide sheet in parallel with the light source of the light guide sheet at a specific pitch.

BRIEF DESCRIPTION OF THE DRAWINGS

FIG. 7 is a diagram explaining a concrete example in case of changing a depth of a groove according to the distance from a right source.

DETAILED DISCLOSURE OF THE INVENTION

The invention is explained according to FIGS. 1 to 9.

Figure 1:
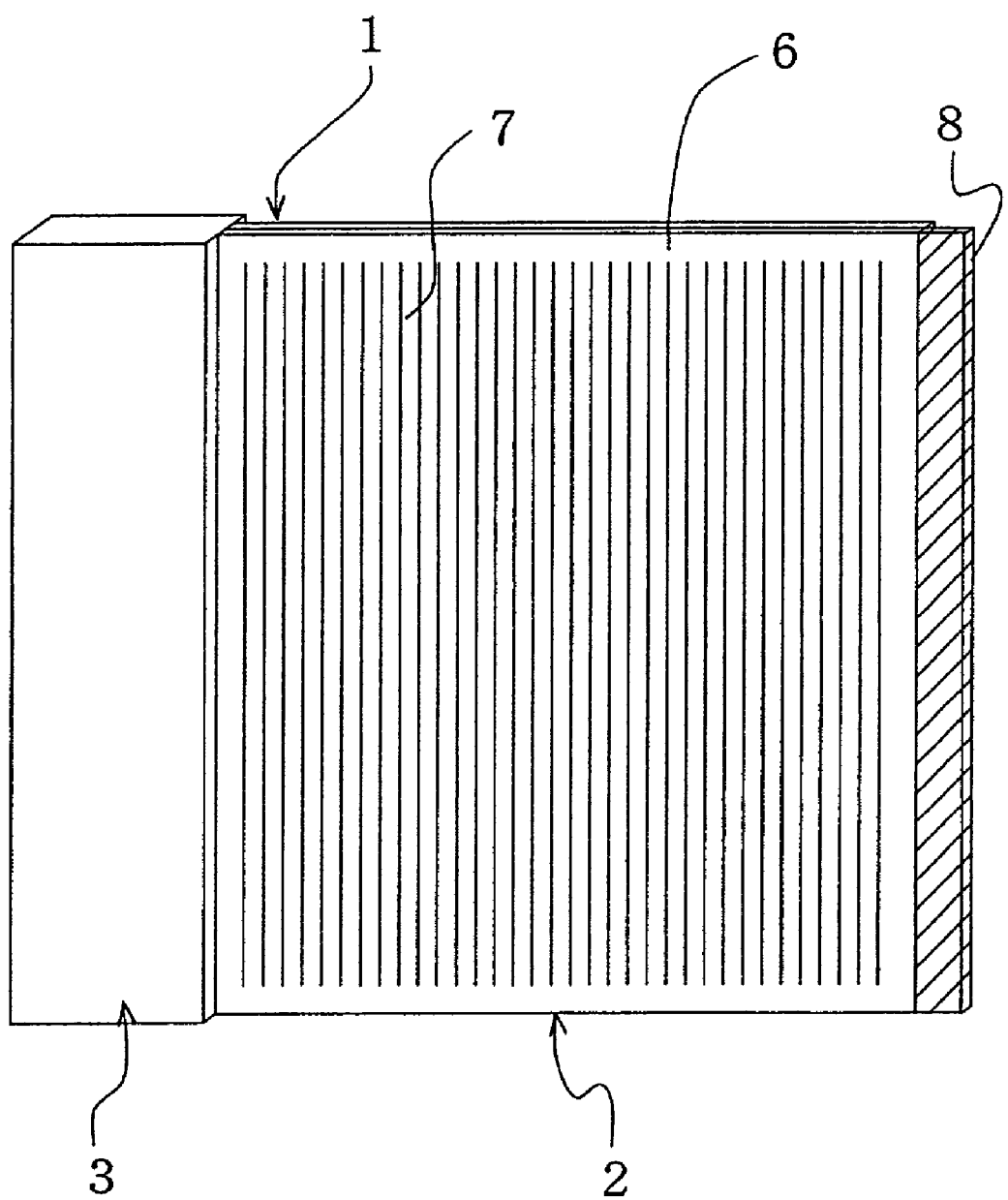
FIG. 1 is an outside view of an electronic paper to which the invention is applied.

As shown in FIG. 1, an electronic paper 1 of the invention comprises a display unit 2 that has an area for displaying data, and a display driving unit 3 for controlling display of the data on the display unit 2.

Figure 3:
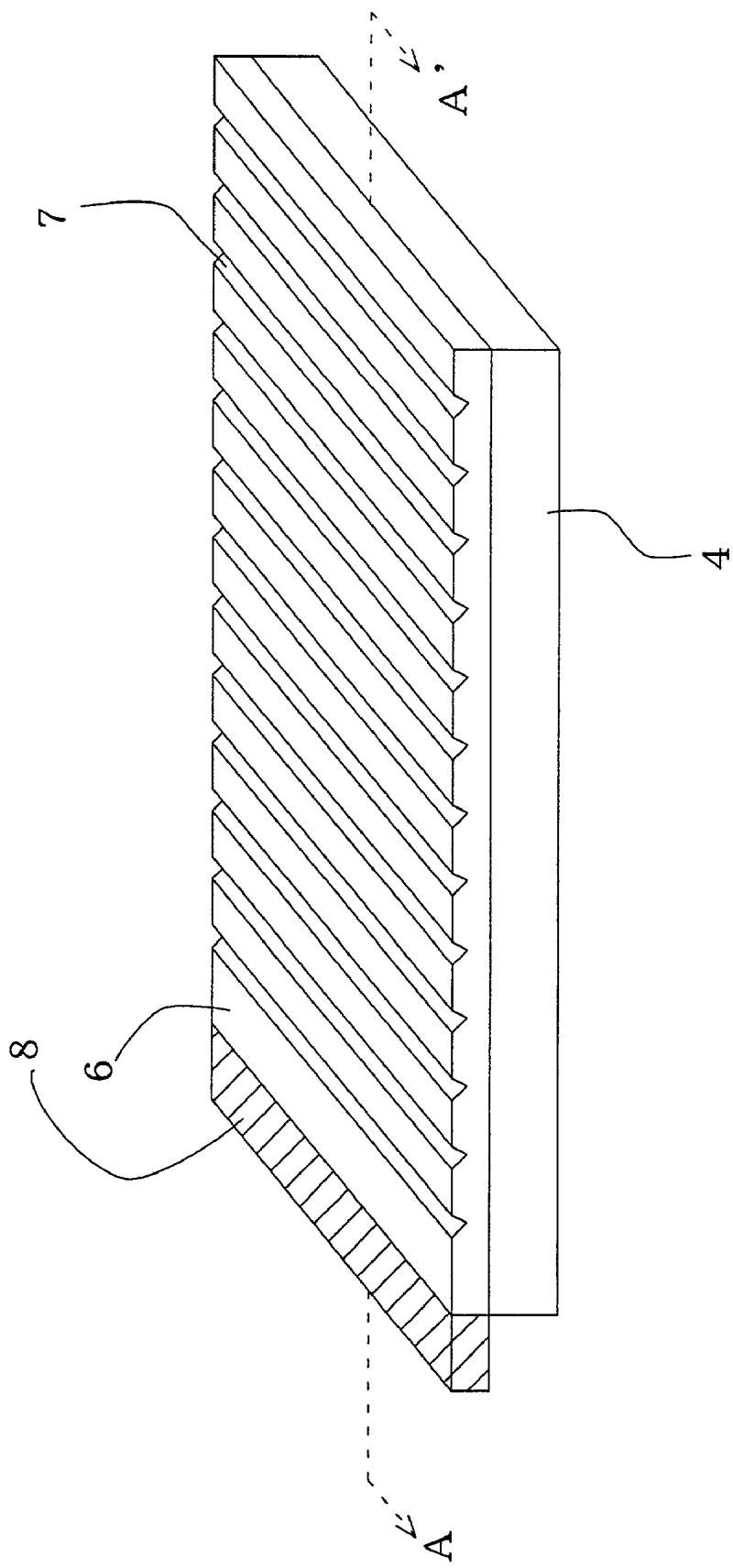
FIG. 3 is a perspective view of a display unit of an electronic paper to which the invention is applied.

The display unit 2, which is in a sheet-like shape, is configured so as a display sheet 4 using a nonvolatile and reflective liquid crystal is directly joined to a light guide sheet 6 for guiding lights irradiated from a light source to the display sheet 4, as shown in FIG. 3.

Figure 4:
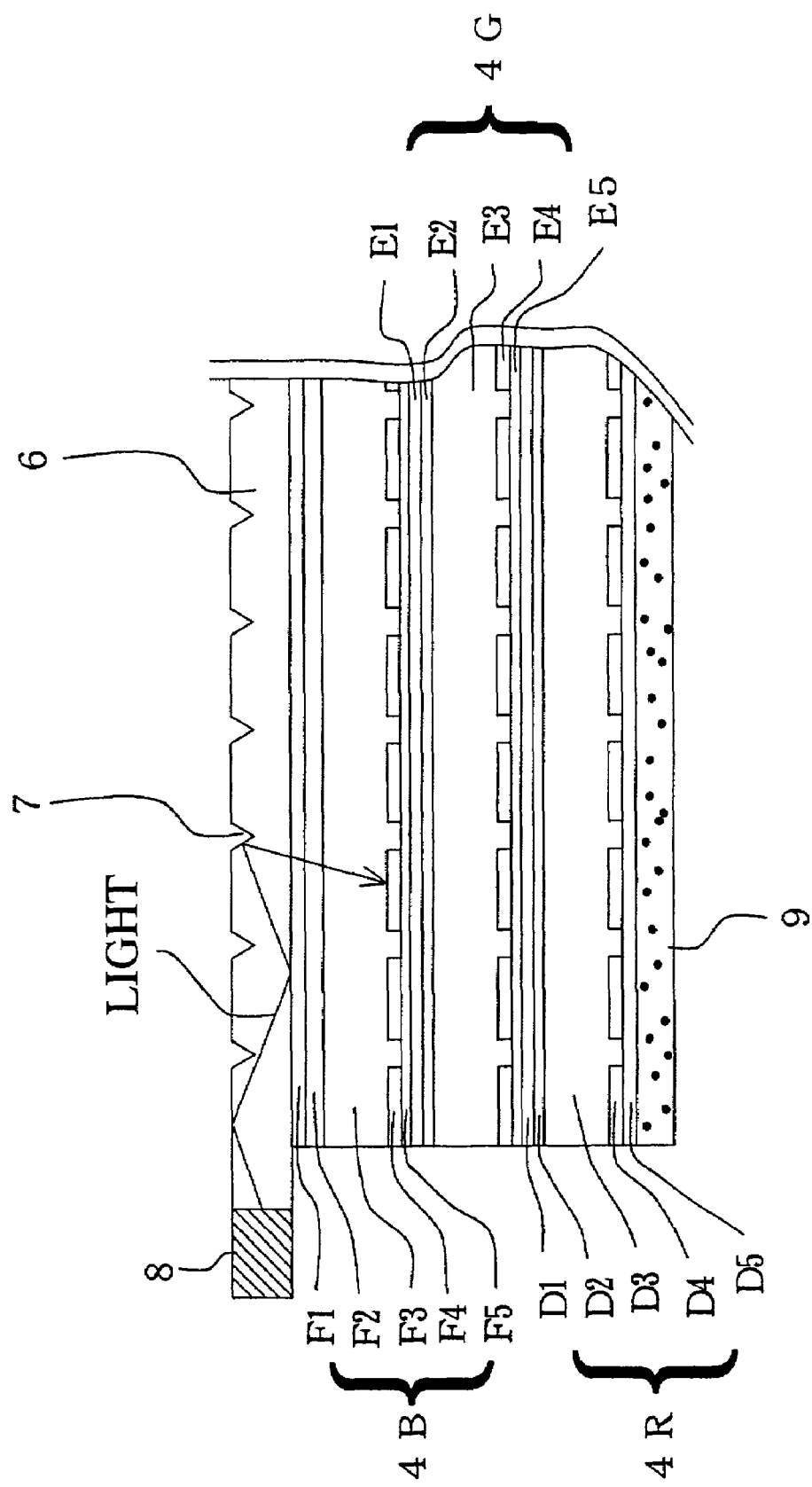
FIG. 4 is a sectional view taken along line A–A' of a display unit of an electronic paper to which the invention is applied.

In case RGB color is displayed, the display sheet 4 of the display unit 2 has a device structure that a display sheet 4R using a nonvolatile and reflective liquid crystal for red color (R), a display sheet 4G using a nonvolatile and reflective liquid crystal for green color (G), and a display sheet 4B using a nonvolatile and reflective liquid crystal for blue color (B) are laminated, as shown in FIG. 4. The structure is explained in detail hereinafter.

First, the display sheet 4R is provided with two sheets of base films D1 and D5 of which indium tin oxide (ITO)(tin oxide) electrodes are printed, evaporated or laminated with a striped pattern at intervals of pixel on one surface. And, the sheets are arranged so as the upper and lower ITO electrodes face each other with reflective liquid crystal D3 between them, and the upper and lower ITO electrodes form the matrix pattern. Of the upper and lower ITO electrodes, the upper ITO electrodes are used as row electrodes D2, while the lower ITO electrodes are used as column electrodes D4.

In the same way of the display sheet 4R, the display sheet 4G is provided with two sheets of base films E1 and E5 of which ITO electrodes are printed, evaporated or laminated with a striped pattern at intervals of pixel on one surface. And, the sheets are arranged so as the upper and lower ITO electrodes face each other with reflective liquid crystal E3 between them, and the upper and lower ITO electrodes form the matrix pattern. Of the upper and lower ITO electrodes, the upper ITO electrodes are used as row electrodes E2, while the lower ITO electrodes are used as column electrodes E4.

Furthermore, the display sheet 4B is also provided with two sheets of base films F1 and F5 of which ITO electrodes are printed, evaporated or laminated with a striped pattern at intervals of pixel on one surface. And, the sheets are arranged so as the upper and lower ITO electrodes face each other with reflective liquid crystal F3 between them, and the upper and lower ITO electrodes form the matrix pattern. Of the upper and lower ITO electrodes, the upper ITO electrodes are used as row electrodes F2, while the lower ITO electrodes are used as column electrodes F4.

Here, one of the row electrodes and the column electrodes in the respective display sheets 4R, 4G and 4B is used as anodes. And the other is used as cathodes. Furthermore, all electrodes to be used as cathodes may be united into a common electrode.

And, the display sheet 4 has a device structure provided with a light absorber layer 9 on a surface opposite to the surface of the laminated display sheets 4R, 4G and 4B joined to the light guide sheet 6. Besides, the light absorber layer 9 absorbs unnecessary light from the light guide 6 permeating the laminated display sheets 4R, 4G and 4B, and thereby the deterioration of the contrast can be prevented.

In the device structure of the display sheet 4 that the display sheets 4R, 4G and 4B are laminated, there are the mutually adjoining base films D1 and E5 and the mutually adjoining base films E1 and F5 in the laminated display sheets 4R, 4G and 4B. However, there can be only either of base films D1 or E5 and either of the base films E1 or F5, for example, the base film D1 and the base film E1.

Next, it is configured so as a light source 8 are attached to at least one side of the light guide sheet 6. Thereby the light from the light source 8 can be guided to a specific position of the display sheet 4. And it is possible to adopt an organic or inorganic electro-luminescence or a light-emitting device as the light source 8, The light guide sheet 6 is provided with a specific number of grooves 7 arranged at a specific pitch in parallel with the light source 8 of the light guide sheet 6 on an upper surface of the light guide 6 where the display sheet 4 is not joined. The each groove 7 has a specific shape and a specific depth of zero point several μm to several hundreds μm, for example.

In this embodiment, the light source 8 is arranged so as to be attached to one side of the light guide sheet 6 opposite to the display driving unit 3 and the light guide sheet 6 is provided with a plurality of grooves 7 in parallel with the light source 8, as shown in FIG. 1 and FIG. 3.

The light guide sheet 6 guides the light from the light source 8 to a specific position on the display sheet 4, and the light shines on the display sheet 4 effectively by the light reflection corresponding to the arrangement and shape of the grooves 7 of the light guide sheet 6. And the grooves 7 are placed between the pixels so as to be in a pitch corresponding to the pixel of the reflective liquid crystal D3, E3 and F3, as shown in FIG. 4. Thereby it is possible to irradiate the display sheet corresponding to the pixel.

Moreover, since the light guide sheet 6 is joined to the display sheet 4 directly, the light guided by the light guide sheet 6 and reflected on the surface of the display sheet 4 is to pass through the light guide sheet 6 again. And the light is to enter the display sheet 4 at a different angle of incidence because of refraction by the groove 7 of the light guide sheet 6. Accordingly the coefficient of utilization of the light can be improved.

Figure 5:
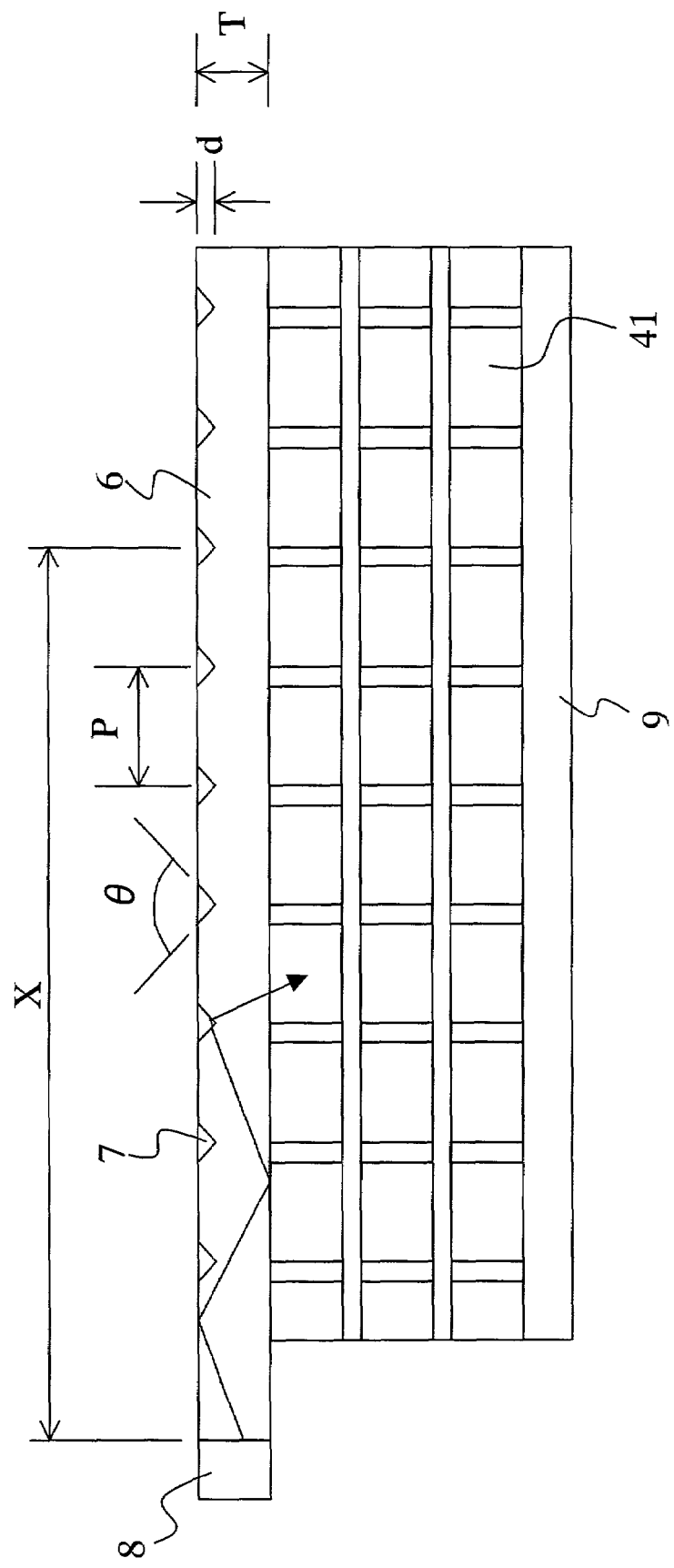
FIG. 5 is a diagram explaining the concrete size of a display unit of an electronic paper to which the invention is applied.

For example, the groove 7 of the light guide sheet 6 has a shape of a triangular prism (the section is in a shape of a triangle) as shown in FIG. 3, FIG. 4 and FIG. 5. When the thickness T of the light guide sheet 6 is from not less than 0.1 mm to not more than 2 mm, the depth d of the groove 7 is preferable to keep from not less than one fifth to not more than one third of the light guide sheet's thickness. The tip angle θ of the groove 7 should be from not less than 60 degrees to not more than 100 degrees. In addition, the more increases the distance X from the light source 8, the more decreases the light volume, and therefore the pitch P of the groove 7 may not be given as a fixed value but may be arranged to be reduced gradually as the groove keeps away from the light source 8.

Figure 6:
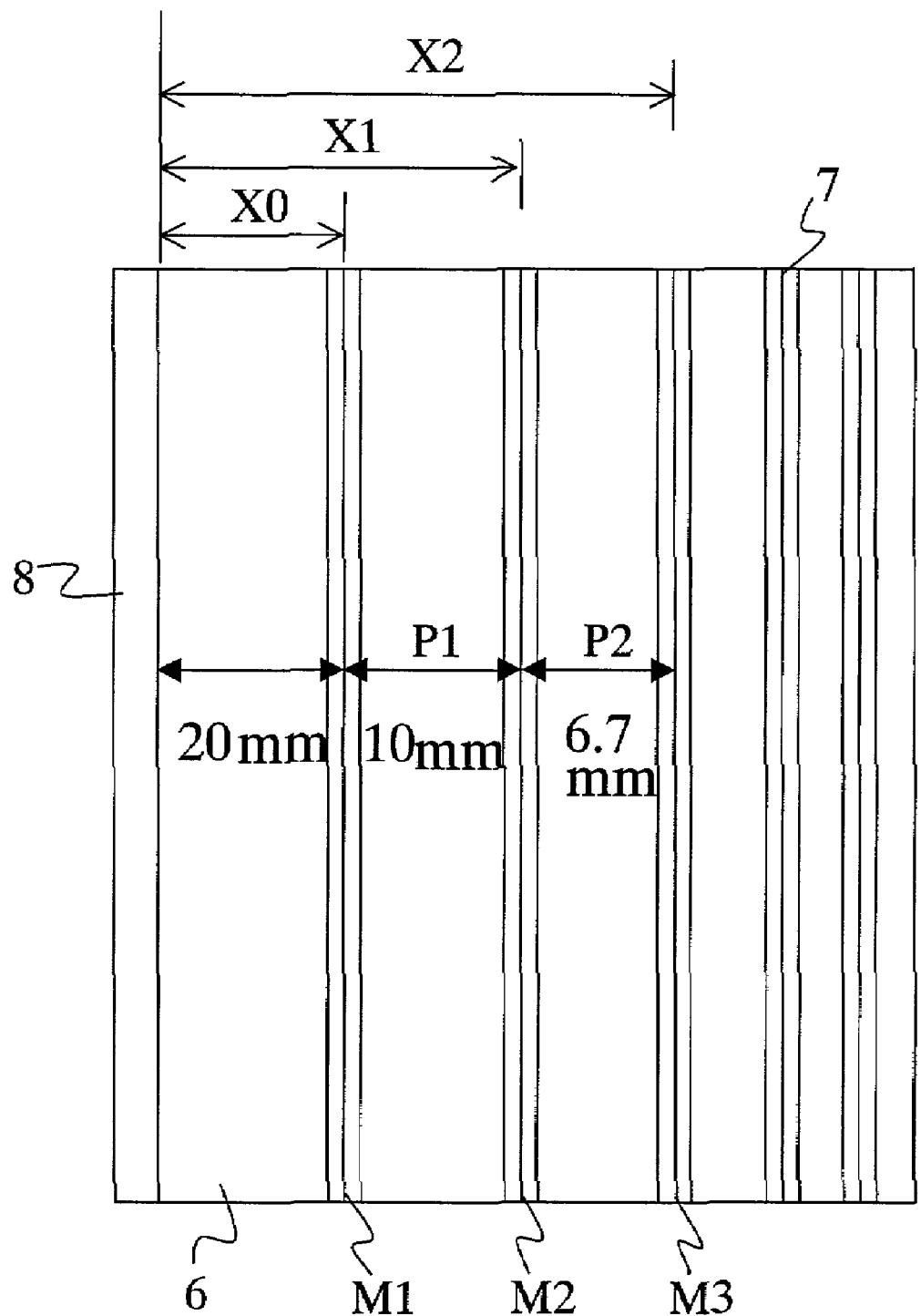
FIG. 6 is a diagram showing a concrete example in case of changing a pitch between grooves according to the distance from a light source.

In the example shown in FIG. 6, the pitch Pn[mn] between a groove Mn and a next groove Mn+1 is definitely expressed by Pn=200/Xn−1, where the length of the light guide sheet 6 is 200 mm and the distance between the groove Mn and the light source 8 is Xn−1[mn]. At this time, the thickness T of the light guide sheet 6 is 0.5 mm while the depth d of the groove 7 is 0.1 mm; the tip angle θ of the groove 7 is 90 degrees. In this example, the pitch P1 between the groove M1 nearest to the light source 8 and the next groove M2 is 10 mm when the distance X0 between the groove M1 and the light source 8 is 20 mm. And the pitch P2 between the groove M2 and the next groove M3 is found as about 6.7 mm since the distance X1 between the groove M2 and the light source 8 is (20+10)=30 mm. As described above, the pitch P of the groove 7 gets smaller gradually as the groove keeps away from the light source 8, thereby illumination can be two-dimensionally uniform.

When the thickens T of the light guide sheet 6 and the depth d and tip angle θ of the groove 7 are within the above-mentioned scope, where the pitch P of the groove 7 is proportioned to the a-th power of the distance from the light source 8 (a is a constant from −0.5 to −3), uniformity required for illumination can be obtained.

When the pitch P of the groove 7 gets smaller as a groove 7 keeps away from a light source gradually as a rule, it occurs that a position of the groove 7 is not corresponding to the joint of a pixel 41. In this case, in order to adjust the pitch P of the groove 7 to the pitch of the pixel 41, the groove 7 may be placed on the joint of the pixel 41 nearest to the position defined by the rule. At this time, if the pitch P of the groove 7 defined by the rule gets smaller than the pitch of the pixel, the following pitch of the groove 7 is made to be the same as that of the pixel. Therefore, without arranging that the pitch P of the groove get smaller than the required size, illumination can be effective and uniform.

In an example shown in FIG. 7(a), the groove 7 is arranged at a constant pitch, however, even in this case, when the depth d of the groove 7 gets larger gradually as the groove keeps away from the light source 8 (dn<dn+1), illumination can be two-dimensionally uniform.

For instance, when the thickness T of the light guide sheet 6 is 0.5 mm, the pitch P of the groove 7 is 1 mm, and the tip angle θ of the groove 7 is 90 degrees, the depth d[μm] of the groove 7 is expressed by d=α×X[mn] provided that α is defined as a constant and as $1.0 \times 10^{-3}$ in this embodiment. At this time, where the distance between the groove 7 nearest to the light source 8 and the light source 8 is 20 mm, the depth d of the groove 7 is found to be 20 μm. The depth d[μm] of the groove 7 next to the groove 7 is found to be 21 μm.

When the thickens T of the light guide sheet 6 and the depth d and tip angle θ of the groove 7 are within the above-mentioned scope, where the pitch P of the groove 7 is proportioned to the b-th power of the distance from the light source 8 (b is a constant from 5 to 3), uniformity required for illumination can be obtained. Besides, when the pitch P of the groove 7 is defined as a constant as described above, the pitch P should be corresponding to the pitch of the pixel 41.

Moreover, by changing both the pitch P and the depth d of the groove 7, illumination can be two-dimensionally uniform.

Figure 8:
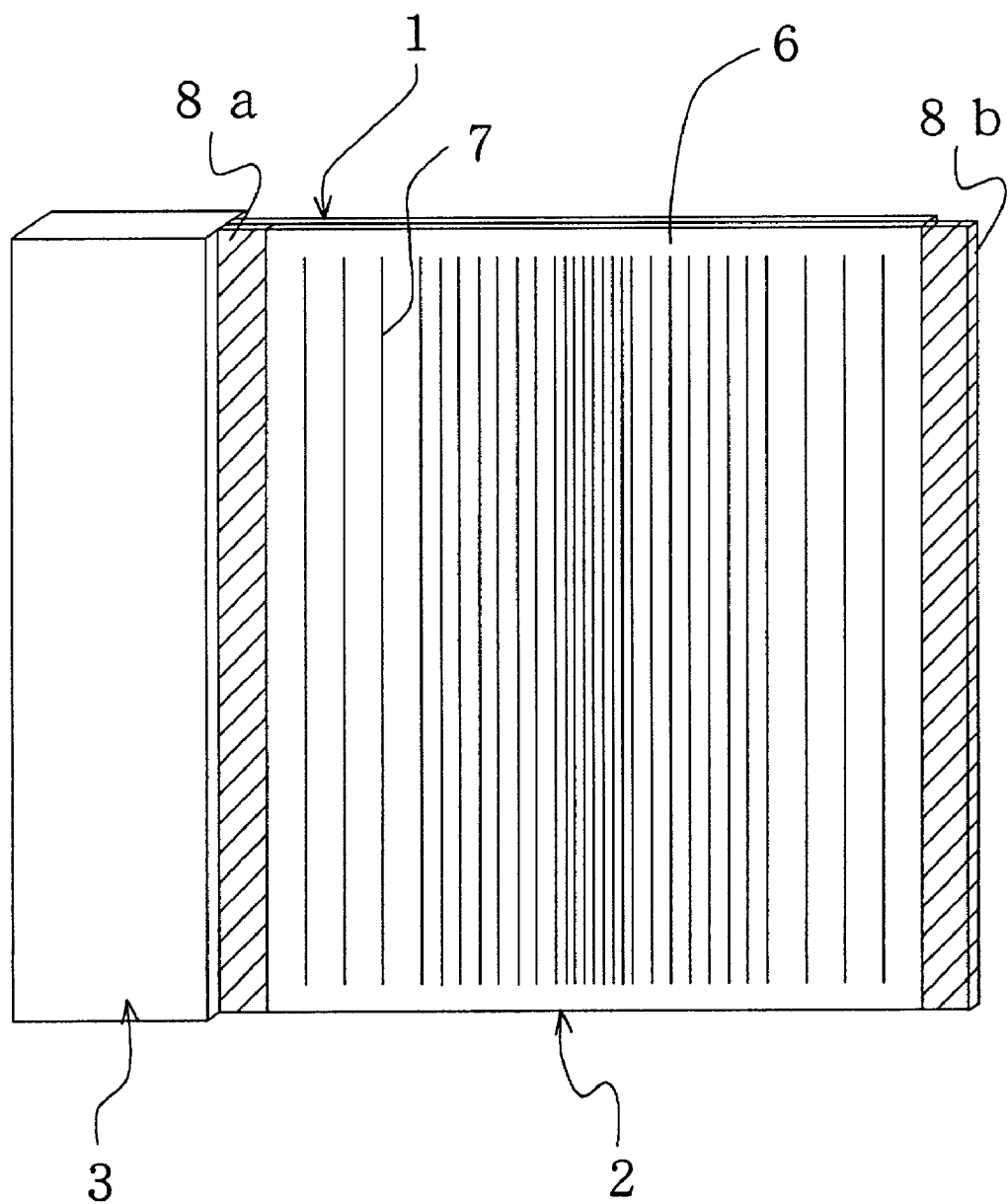
FIG. 8 is an outside view of another configuration of an electronic paper to which the invention is applied.

There is other configuration as shown in FIG. 8 that two light sources are provided on the both side of the light guide sheet 6. The light source 8a is provided on a position between the display driving unit 3 and the light guide sheet 6 while the light source 8b is provided so as to be opposite to the light source 8a. In this case, the light guide sheet 6 is provided with a plurality of grooves 7 in parallel with the light sources 8a and 8b and arranged at a pitch getting fine gradually as getting closer to the center of the light guide sheet 6.

The following explanation refers to the operations of respective reflective liquid crystals D3, E3 and F3 of the display sheets 4R, 4G and 4B. In case of the display sheet 4R, when a specific voltage is impressed between the row electrode D2 and the column electrode D4, it changes the orientation of the reflective liquid crystal D3 of the pixel corresponding to the position, which is called as "address" hereafter, where the row electrode D2 and the column electrode D4 are crossed. The red light corresponding to the reflective liquid crystal D3 is reflected or is transmitted according to the change of orientation, thereby it is possible to display or eliminate in red per pixel. For instance, when the displaying in red is performed, the orientation of the reflective liquid crystal D3 may be changed so as to reflect the red light by impressing the specific positive voltage. On the other hand, when the displaying in red is eliminated, the orientation of the reflective liquid crystal D3 may be changed so as to transmit the red light by impressing a specific negative voltage. When the voltage is not impressed, the orientation of the reflective liquid crystal D3 is maintained without change. Therefore, the state of the displaying is also maintained. The operations of the display sheets 4G and 4B are the same as that of the display sheet 4R.

Figure 2:
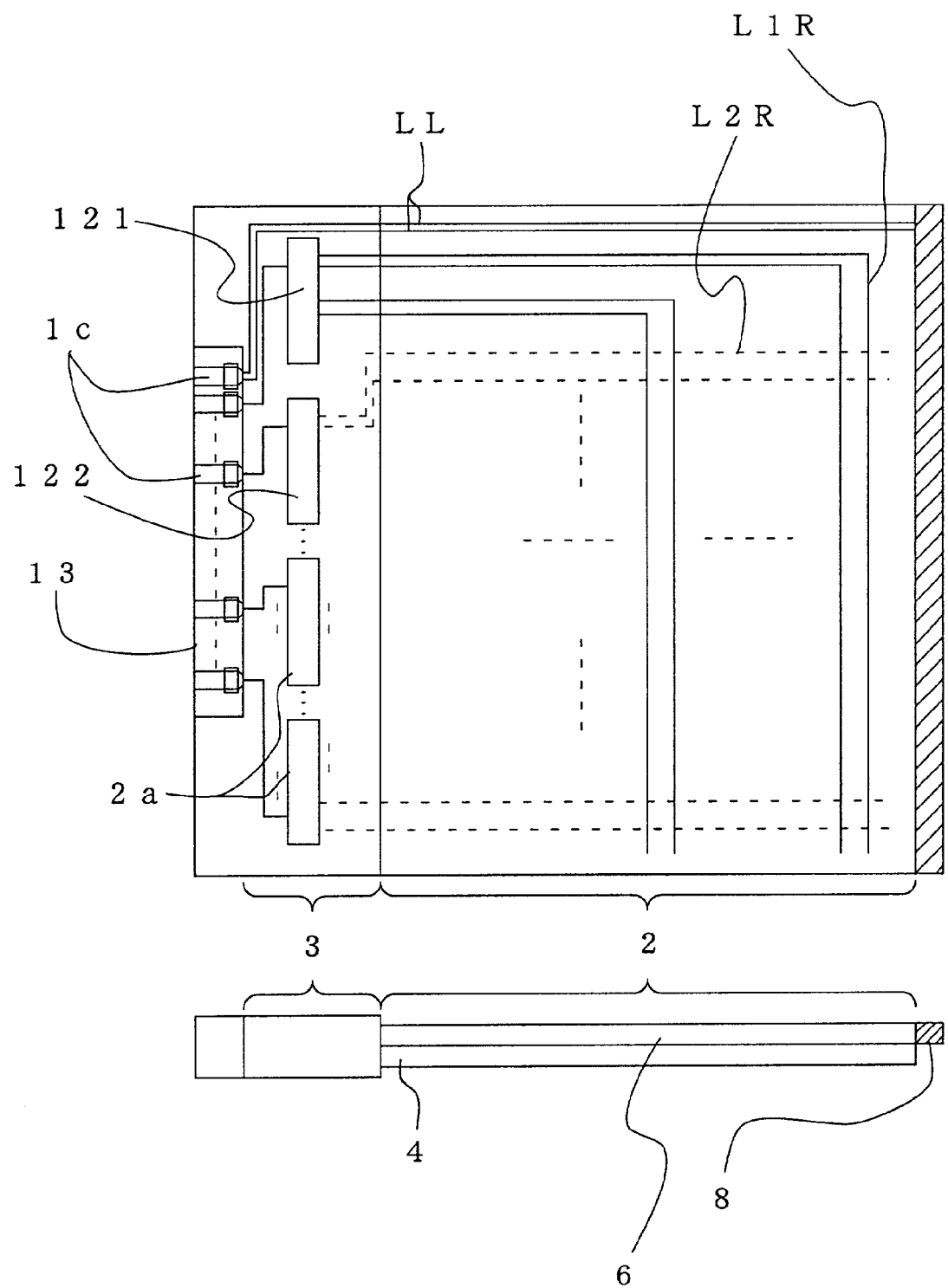
FIG. 2 is a block diagram of an electronic paper to which the invention is applied.

FIG. 2 shows a block diagram of the electronic paper 1 comprising the display unit 2 wherein the display sheet 4 is directly joined to the light guide sheet 6.

The display driving unit 3 of the electronic paper 1 is provided with display drivers 12a (a: the number for distinguishing a display driver from others, and represented by 1, 2, 3 . . . m) consisting of a plurality of semiconductor chips. The display driver 12a is wired for each layer of the reflective liquid crystals of R,G,B. For instance, in the display sheet 4R, the row wiring L2R consists of the row electrode D2 and wiring between the row electrode D2 and the display driver 122, while the column wiring L1R consists of the column electrode D4 and wiring between the column electrode D4 and the display driver 121. And the row wiring and the column wiring are respectively connected with different semiconductor chips. In the respective display sheets 4G and 4B, the display driver 12a is wired in the same way of the display sheet 4R.

The display driver 12a decodes display data by means of control means 21 comprised in the following electronic paper file 20; the display data is in a size of a specific bit and consists of data sent per data corresponding to one pixel of respective display sheets 4R, 4G and 4B (which is called "pixel data" hereinafter) and the position information of data corresponding to the address of the pixel. And then the control means 21 outputs the voltage corresponding to the decoded data to the row wiring and the column wiring per the display sheet 4R, 4G and 4B corresponding to the coordinates position.

In the display sheet 4 of the display unit 2, each liquid crystal D3, E3 and F3 of the pixel corresponding to the address to which the voltage is outputted per the display sheet 4R, 4G and 4B has a specific orientation, and the light of R, G, B is reflected or transmitted. Thereby, the data is displayed in the color mode or the display of the data is eliminated. For instance, for displaying one pixel in red, respective reflective liquid crystals E3 and F3 of the pixel of the display sheet 4G and 4B are oriented so as to transmit the light, while the reflective liquid crystal D3 of the pixel of the display sheet 4R is oriented so as to reflect the light. In addition, for displaying one pixel in white, respective reflective liquid crystals D3, E3 and F3 of the pixel of the display sheet 4R, 4G and 4B are oriented so as to reflect the light, that is to say, so as to reflect the RGB lights.

The number of the semiconductor tips used as the display driver 12a may be determined properly by the method of controlling to output the voltage to the column wiring and row wiring per the display sheet 4R, 4G and 4B. It is possible to consider other methods as the wiring method of the display driver 12a and the row and column electrode per the display sheet 4R, 4G and 4B, but the detailed explanation is not described here.

Figure 9:
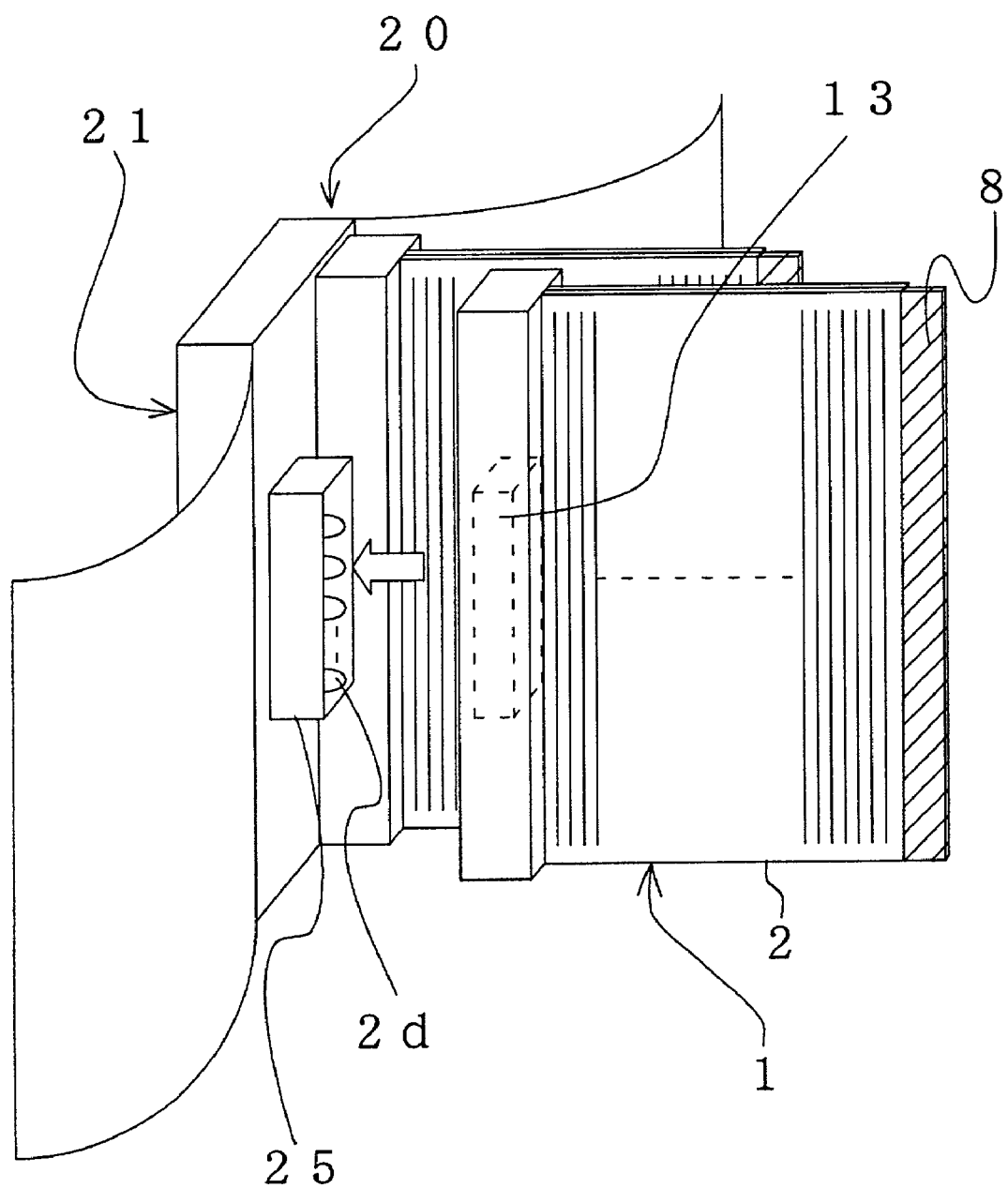
FIG. 9 is an outside view of an electronic paper file to which the invention is applied.
Figure 10:
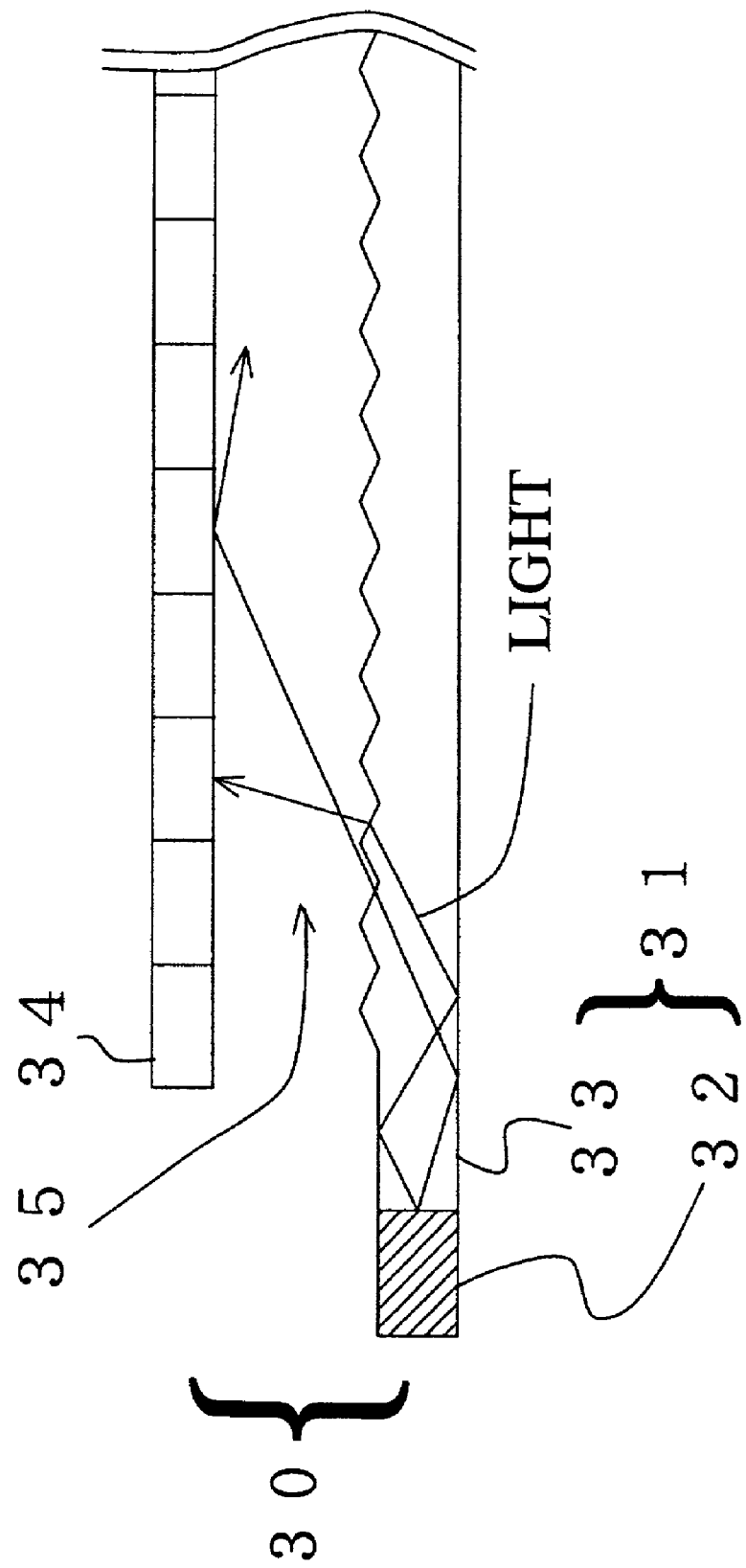
FIG. 10 is a block diagram of a conventional display medium provided with a display unit of a reflective liquid crystal and a front-light.

As shown in FIG. 2 and FIG. 9, a female connection terminal 13 is provided on one side of the electronic paper 1, and while a male connection terminal 25 is provided at a corresponding position of the electronic paper file 20 (a back side of a back). The female connection thermal 13 and the male connection terminal 25 are in pairs. The female connection terminal 13 is connected with the male connection terminal 25 so as to be capable of attaching/detaching. The female connection terminal 13 is provided with a connecting function physically capable of detaching/attaching the electronic paper 1 from/to the electronic paper file 20 and the function ensuring the electric connection performance.

That is to say, the connection terminal 13 of the electronic paper 1 is provided with pin receivers 1c (c: the number for distinguishing a pin receiver from others, and represented by 1, 2 ... n) corresponding to the number of wiring from the display driver 12 and corresponding to the wiring LL from the light source 8. On the other hand, the connection terminal 25 of the electronic paper file 20 is provided with the corresponding numbers of pins 2d (d: the number for distinguishing a pin of a connection terminal from others, and represented by 1, 2 ..., n) at the potion corresponding to the pin receiver 1c. By connecting the female and male connection terminals 13 and 25, the display driver 12a of the electronic paper 1 can be connected electrically with the control means 21, etc. comprised in the electronic paper file 20.

It is needless to say that the electronic paper 1 and the electronic paper file 20 may be connected electrically with each other somehow; for example, it may be by wireless (IRDA, etc.). In such case, the electronic paper 1 and the electronic paper file 20 must be provided with communication means capable of the wireless connection respectively.

It can consider the outside view of the electronic paper 1 as the length of longitudinal direction of the display driving unit 3 is the same as the length of one side of external of the display unit 2, for example, as shown in FIG. 1, or the length of longitudinal direction of the display driving unit 3 is longer than the length of one side of external of the display unit 2 (which is not shown in the drawing). And the thickness of the electronic paper 1 is preferable to get thicker as much as possible.

Besides, it is preferable that a material to be used the display driving unit 3 should have the Young's module larger than that of the display unit 2 so as to prevent the display driver 12a of the semiconductor chip from the damage.

The control means 21 is provided at a specific position on the back of the electronic paper file 20 as shown in FIG. 9, and comprises signal sending-receiving means and display light emitting control means (not shown).

The signal sending-receiving means receives from other electronic paper files or a personal computer the data comprising the pixel data and the position information to be displayed on the display sheet 4 of the electronic paper 1, and sends the received data to the display light emitting control means.

The display light emitting control means attaches to the data received from the signal sending-receiving means a specific bit of data to instruct whether the received data should be written into the display sheet 4, and then sends them to the electronic paper 1 as the specific bit of display data per data corresponding to a pixel.

That is to say, the control means 21 controls the display of data when the electronic paper 1 to which data is written is installed to the electronic paper file 20 by using the connection terminals 13 and 25.

In the above-mentioned embodiment, the invention is applied to the electronic paper and the electronic paper file, however it is possible to apply the invention to other display device such as the liquid crystal panel comprising the display sheet and the light guide sheet, and the like.

As described above, the display unit of the invention is configured so as the light guide sheet is directly joined to the upper surface of the display sheet, and the upper surface of the light guide sheet is provided with a specific number of grooves to have a specific shape and a specific depth in parallel with the light source of the light guide sheet at a specific pitch. Thereby it is possible to improve the coefficient of utilization of the light.

The display sheet has a reflective type structure that a display sheet using a nonvolatile and reflective liquid crystal for red color, a display sheet using a nonvolatile and reflective liquid crystal for green color, and a display sheet using a nonvolatile and reflective liquid crystal for blue color are laminated. Thereby the number of pixels for the display in the color mode can be as much as that in the monochrome mode. Moreover, the other surface of the display sheet not joined to the light guide sheet is provided with the light absorber layer, thereby it is possible to prevent the deterioration of the contrast.

The invention claimed is:

1. A display device comprising:
    a display sheet;
    a light guide sheet, a surface of which is in direct contact with a surface of the display sheet; and
    a light source placed on at least one side of the light guide sheet, wherein
    the light guide sheet is provided with a specific number of grooves to have a specific shape and a specific depth on a surface opposite to the surface of the light guide sheet joined to the display sheet in parallel with the light source at a specific pitch,
    the pitch of the grooves is corresponding to a pixel of the display sheet, and
    the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

2. A display device comprising:
    a display sheet;
    a light guide sheet, a surface of which is in direct contact with a surface of the display sheet; and
    a light source placed on at least one side of the light guide sheet, wherein
    the light guide sheet is provided with a specific number of grooves to have a specific shape and a specific depth on a surface opposite to the surface of the light guide sheet joined to the display sheet in parallel with the light source at a specific pitch,
    the pitch of the grooves gets smaller gradually as the groove keeps away from the light source, and
    the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

3. A display device comprising:
    a display sheet;
    a light guide sheet, a surface of which is in direct contact with a surface of the display sheet; and
    a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, the pitch of the grooves gets smaller gradually as the groove keeps away from the light source, and the pitch of the grooves is proportioned to the a-th power of the distance from the light source (a is a constant from −0.5 to −3).

4. A display device comprising:

a display sheet;

a light guide sheet, a surface of which is in direct contact with a surface of the display sheet; and a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, the depth of the groove gets larger gradually as the groove keeps away from the light source, and the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

5. A display device comprising:

a display sheet;

a light guide sheet, a surface of which is in direct contact with a surface of the display sheet; and a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, the depth of the groove gets larger gradually as the groove keeps away from the light source, and the depth of the groove is proportioned to the b-th power of the distance from the light source (b is a constant from 0.5 to 3).

6. A display device according to claim 3 or 5, wherein the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

7. An electronic paper comprising:

a display sheet using a nonvolatile and reflective liquid crystal;

a light guide sheet, a surface of which is in direct contact with a surface of the display sheet; and a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, the pitch of the grooves is corresponding to a pixel of the display sheet, and the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

8. An electronic paper comprising:

a display sheet using a nonvolatile and reflective liquid crystal;

a light guide sheet, a surface of which is in direct contact with a surface of the display sheet; and a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, and the pitch of the grooves is proportioned to the a-th power of the distance from the light source (a: a constant from −0.5 to <3).

9. An electronic paper comprising:

a display sheet using a nonvolatile and reflective liquid crystal;

a light guide sheet, a surface of which is in direct contact with a surface of the display sheet; and a light source placed on at least one side of the light guide sheet, wherein the light guide sheet is provided with a specific number of grooves to have a specific shape and a specific depth on a surface opposite to the surface of the light guide sheet joined to the display sheet in parallel with the light source at a specific pitch, and the depth of the groove is proportioned to the b-th power of the distance from the light source (b: a constant from 0.5 to 3).

10. An electronic paper according to claim 8 or 9, wherein the thickness of the light guide sheet is from not less than 0.1 mm to not more than 2 mm, the depth of the groove is from not less than one fifth to not more than one third of the light guide sheet's thickness, and a tip angle of the groove is from not less than 60 degrees to not more than 100 degrees.

* * * * *